United States Patent
Berecz

(10) Patent No.: US 7,240,609 B2
(45) Date of Patent: Jul. 10, 2007

(54) RIGID FRAMED WINE BARREL WITH REPLACEABLE WOOD PANELS

(76) Inventor: Imre Berecz, 74 Via Barcaza, Trabuco Canyon, CA (US) 92679

( * ) Notice: Subject to any disclaimer, the term of this patent is extended or adjusted under 35 U.S.C. 154(b) by 473 days.

(21) Appl. No.: 10/773,828

(22) Filed: Feb. 9, 2004

(65) Prior Publication Data

US 2005/0172817 A1    Aug. 11, 2005

(51) Int. Cl.
B65D 25/00    (2006.01)
B65D 61/00    (2006.01)

(52) U.S. Cl. .................. 99/277.1; 220/4.17; 220/4.33; 217/88; 217/76

(58) Field of Classification Search ............... 99/277.1, 99/277.2, 277; 217/76, 72, 79, 88, 4; 220/592.19, 220/4.33, 4.17, 608, 676
See application file for complete search history.

(56) References Cited

U.S. PATENT DOCUMENTS

| | | | | |
|---|---|---|---|---|
| 1,202,858 A | * | 10/1916 | Lachman | 229/4.5 |
| 3,462,038 A | * | 8/1969 | Morris | 217/72 |
| 4,093,099 A | * | 6/1978 | Spooner | 217/72 |
| 4,484,688 A | * | 11/1984 | Smith | 217/91 |
| 4,813,565 A | * | 3/1989 | Croser | 217/88 |
| 4,953,730 A | * | 9/1990 | Prime et al. | 217/4 |
| 5,092,488 A | * | 3/1992 | Pradel | 220/600 |

* cited by examiner

Primary Examiner—Reginald L. Alexander
(74) Attorney, Agent, or Firm—Edward E. Roberts

(57) ABSTRACT

A wine barrel having a rigid external reusable frame with replaceable wooden side panels and substantially identical upper and lower wooden ends assembled within the rigid external frame to provide a wooden enclosure for the wine. A liquid tight container is provided; the wine exposed only to wooden surfaces. Panels can be replaced in the frame with new panels or existing panels having an unused side can be removed, reversed, and reused. Assembly of the barrel is straightforward requiring only minimum tools and skills without the need for the hand-fitting expertise required in constructing a traditional barrel. When assembled, the rigid frame, and not the wood panels, supports all the external and internal loads of the wine barrel. For introduction of a caramel taste to the wine the wood panels can be initially placed in an oven with the degree of caramelization controlled by the oven temperature and exposure time.

15 Claims, 8 Drawing Sheets

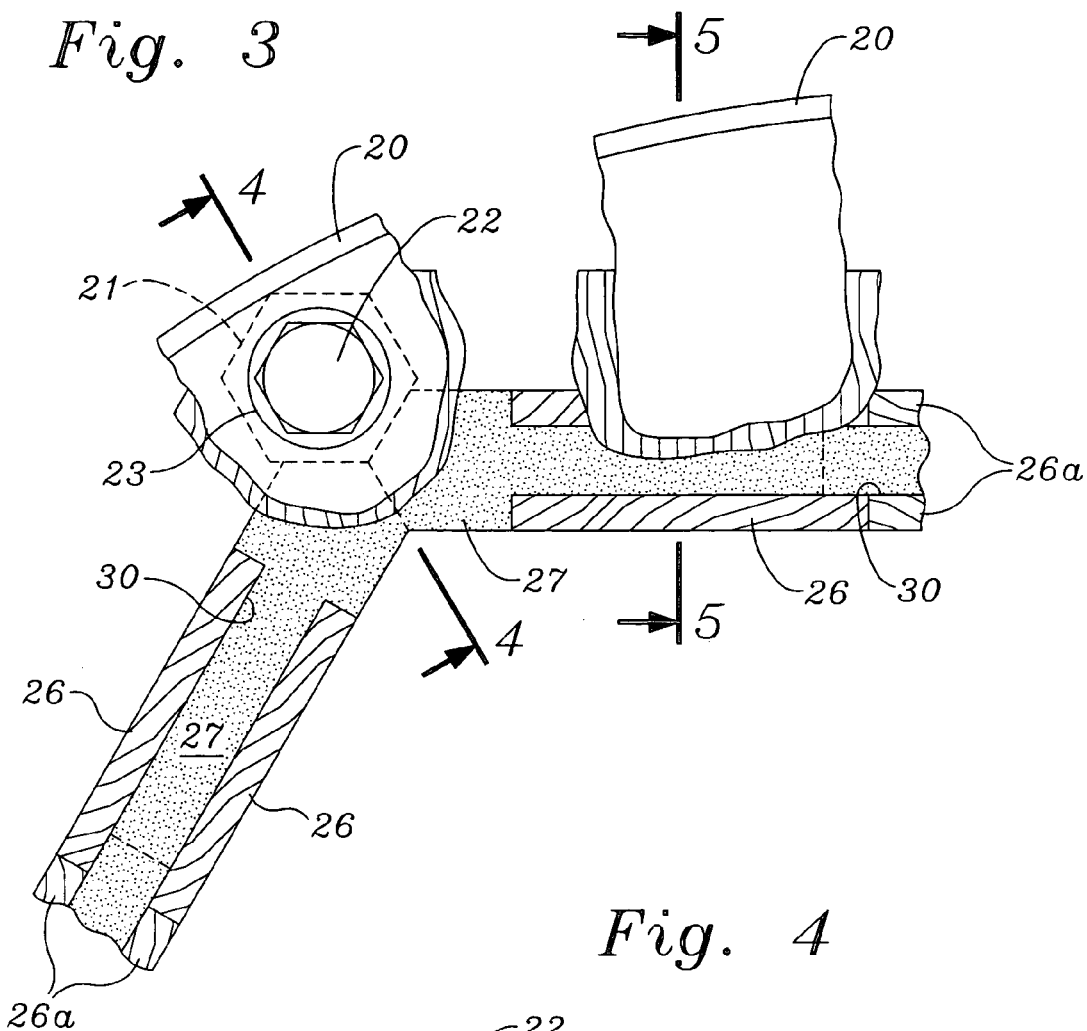
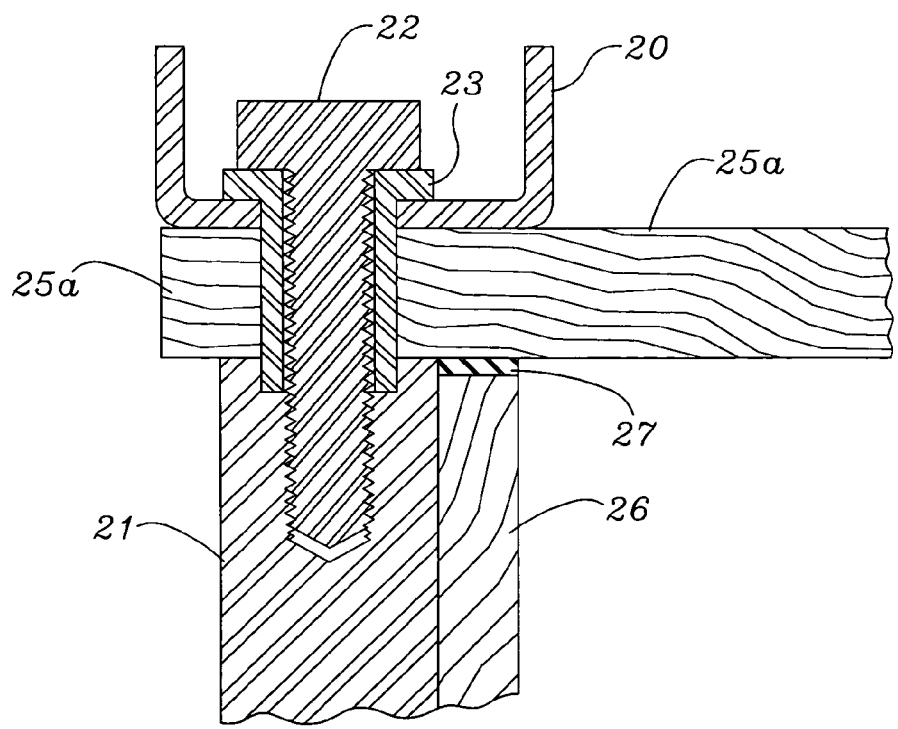

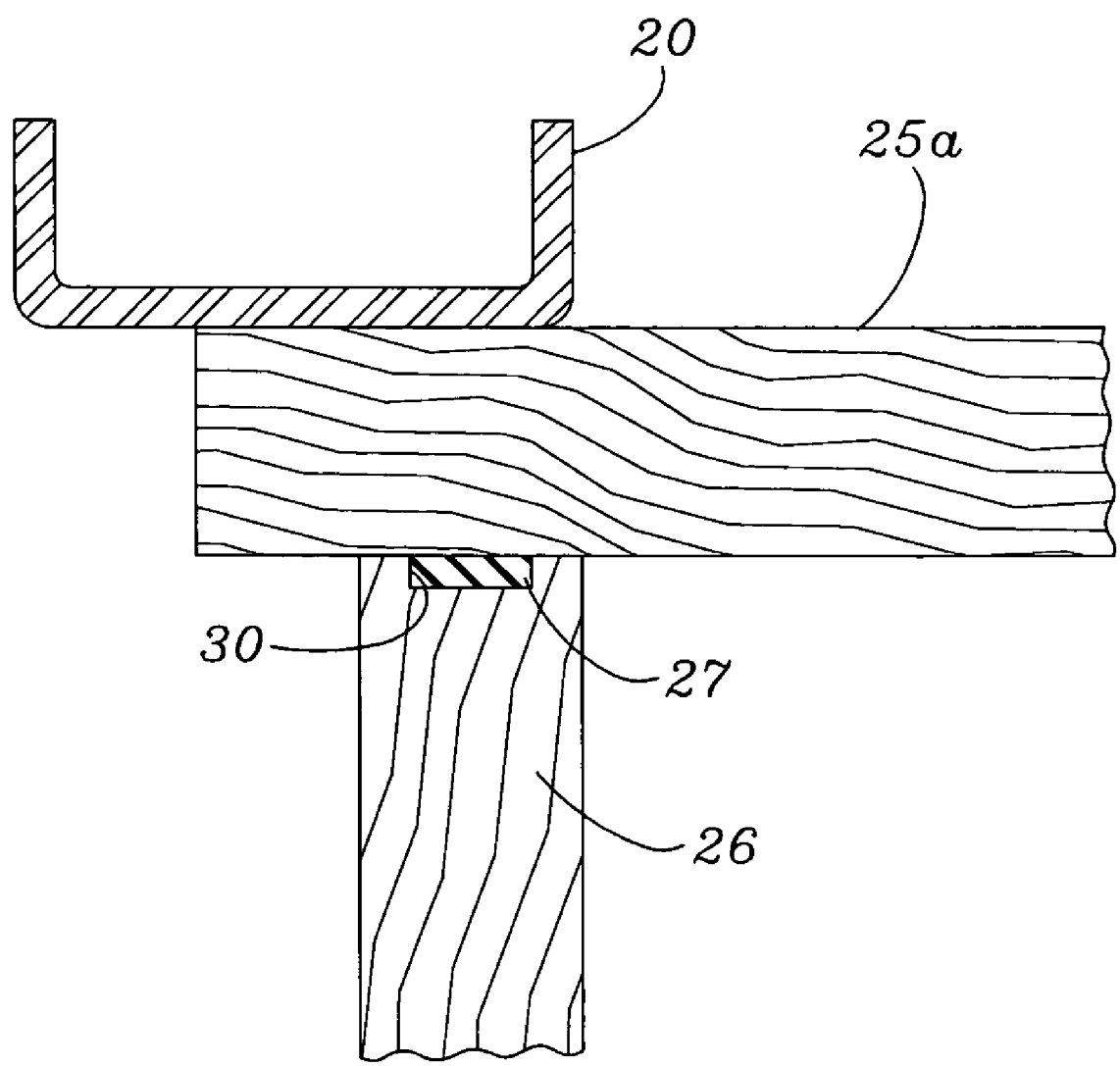

RIGID FRAMED WINE BARREL WITH REPLACEABLE WOOD PANELS

BACKGROUND

The background of the invention will be discussed in two parts.

1. Field of the Invention

The invention relates generally to barrels and other containers in general, and particularly to a rigid framed wine barrel having replaceable wooden panels.

2. Description of the Related Art

Wine barrels have long been commonly constructed of oak material since the oak wood has been found to provide desirable wine making characteristics such as aiding in the maturing of the wine as well as imparting a distinctive oak and tannin flavoring to the wine. Thus, to produce quality wine that is rich in the oak and tannin taste, winemakers age the wine in oak barrels.

During the aging process, the wine obtains a suitable amount of oxygen and tannin through the pores of the oak to obtain the desired taste. However, over time the amount of tannin received by the wine from inside of the wood pores is detrimentally decreased eventually requiring replacement of the barrels. Traditional oak barrels having a capacity of 225 liters are generally used only about 2 or 3 times before requiring replacement.

Thus, since the desired oak flavoring characteristics degrade with repeated use requiring barrel replacement after limited use, this, combined with the rather expensive original cost of oak barrels, has established a need for an alternate wine barrel concept. Attempts have been made to provide alternate wine barrel configurations with the objective of reducing costs and usage of timber, one of which is disclosed in U.S. Pat. No. 4,813,565 issued to Brian J. Croser on 21 Mar. 1989. Croser discloses a wine cask having a circular metal base and a circular metal end cover with a plurality of oak staves arranged circumferentially and lying edge to edge clamped by a circumferential clamp that retains the staves in a cylindrical configuration. A tension clamp extends on an axial direction between the circular metal base and circular metal end cover and clamps the staves between them. While this method permits introduction of oxygen to the wine, it is to a much lesser extent due to the top and bottom metal end plates. Furthermore, this configuration does not lend itself to stacking of the barrels. For instance, if it is desired to stack barrels end to end, problems are created since the wood staves float between the gaskets at each end and if weight is put on these ends the gaskets are compressed. Removal of the weight results in leakage. Further, this type of barrel cannot be rolled during transport because of the clamps on the outside of the barrel.

Another alternate wine barrel configuration is disclosed in U.S. Pat. No. 5,174,461 issued to Stephen T. Sullivan on 29 Dec. 1992. Sullivan discloses a stainless steel wine barrel body having a circumferential stave holder secured to the inside surface of the barrel for supporting oak staves thereon, with the intention to thereby impart oak characteristics to the wine as it matures. The oak staves are inside of a stainless steel body with one removable end to replace the staves after use. There is a problem in that the stainless steel body will not permit oxygen to be introduced to the wine to augment the aging process and to provide the desirable characteristics to the wine. Thus, stainless steel tanks are not used for quality aging of wine.

U.S. Pat. No. 5,647,268 issued to Stephen T. Sullivan on 15 Jul. 1997 discloses apparatus for use with standard wine barrels wherein small oak staves are inserted through a bung-hole in the barrel to thereby impart oak characteristics to wine.

U.S. Pat. No. 5,481,960 issued to Stephen T. Sullivan on 09 Jan. 1996 discloses an infusion tube for use with standard wine barrels for imparting oak characteristics to wine.

U.S. Pat. No. 5,054,381 issued to DePeaux et al. on 08 Oct. 1991 discloses another wood insertion method for use with standard wine barrels.

The above related art are illustrative of the various approaches made to satisfy the existing need for different ways of imparting oak characteristics to wine without using the traditional solid oak barrels. However, the related wine barrel concepts remain limited in this regard. The present invention satisfies the existing need by providing a wine barrel having a rigid frame enclosing replaceable uniform oak panels. The panels are straight and symmetrical and after 2 or 3 uses can easily be removed, turned inside out, and replaced within the frame to be used again. This procedure makes better use of the oak wood thereby reducing the barrel cost substantially without compromising quality. Furthermore, once both sides of the wood panels have been used they can be replaced within the rigid frame with new panels. This is relatively easily done without the need for the skilled labor required when making traditional wood barrels.

Additionally, the load carrying ability of the traditional wood barrel is established by the thickness of the staves. For instance, the traditional 225-liter barrel has appropriate wall thickness to provide adequate oxygen to the wine while providing sufficient load carrying ability to allow stacking of the barrels. Larger barrels require increased thickness for load carrying ability; however, this decreases oxygen passage through the pores of the wood to the wine to the detriment to the wine aging process. The present invention does not have this constraint since the frame, and not the wood panels, carries the load, thus enabling the winemaker to specify wood thickness depending on the amount of oxygen he wishes to introduce to the wine without concern for stacking of the barrels. Also, as constructed, the outside rigid frame does not come in contact with the wine, the wine only in contact with interior oak wood, and once both sides of the wood panels have been exhausted, the frame can be used repeatedly with new wood panels.

Further, winemakers often introduce a caramel taste to the wine by burning the inside of the traditional barrel during the process of making the barrel. This procedure requires skilled labor to provide the degree of caramelization desired by the winemaker. In contrast, with the present invention the wood panels can be burned in an oven with the degree of caramelization controlled by the oven temperature and time.

It is thus an aspect of the invention to provide a reduced cost wine barrel assembly having a re-useable rigid barrel frame that eliminates cooperage skill and time that is required to produce traditional barrels.

It is a further aspect of the present invention to provide a barrel assembly having replaceable oak components in abutting arrangement within a rigid frame sealed in a manner to prevent leakage of the maturing wine.

It is still further an aspect of the present invention to provide a reduced cost barrel assembly having a re-useable rigid barrel frame that provides varied position stacking strength.

It is also an aspect of the present invention to provide a barrel assembly having replaceable oak components whereby the wine comes only in contact with the wood of the barrel.

Other aspects, features and advantages of the invention will become apparent from a reading of the specification, when taken in conjunction with the drawings, in which like reference numerals refer to like elements in the several views.

SUMMARY

In accordance with the present invention there is provided a wine barrel having a rigid reusable frame that reduces cost by eliminating the cooperage skill and time that is required to produce traditional barrels. Assembly of the barrel of the invention is straightforward and requires only minimum tools and skills without the need for the hand-fitting expertise required in constructing a traditional barrel. The rigid reusable frame provides sufficient stacking strength and encloses replaceable wood panels that create a liquid tight container, the wine in the barrel exposed only to wooden surfaces. The panels can be removed from the frame, turned inside out, replaced and reused. They are generally straight and symmetrical and easily constructed with modern machinery having computer controls capable of repeated production of uniform wood panel components. For introduction of a caramel taste to the wine the wood panels can be burned in an oven with the degree of caramelization controlled by the oven temperature and time. The rigid frame is comprised of substantially identical upper and lower ends assembled with rigid connecting bars. Within the connecting bars and upper and lower ends are wood panels assembled to provide the wooden enclosure for the wine. When assembled, the rigid frame, and not the wood panels, supports all the external and internal loads of the wine barrel. The wine only comes in contact with the wood of the barrel.

DRAWINGS

FIG. 3 is a partially cut away top view of one corner of the wine barrel of FIG. 1 and with the "U" shape channel partially cut away;

FIG. 4 is a sectional view of the wine barrel of FIG. 1 along lines 4-4 of FIG. 3;

FIG. 5 is a sectional view of the wine barrel of FIG. 1 along lines 5-5 of FIG. 3;

Figure 6A:
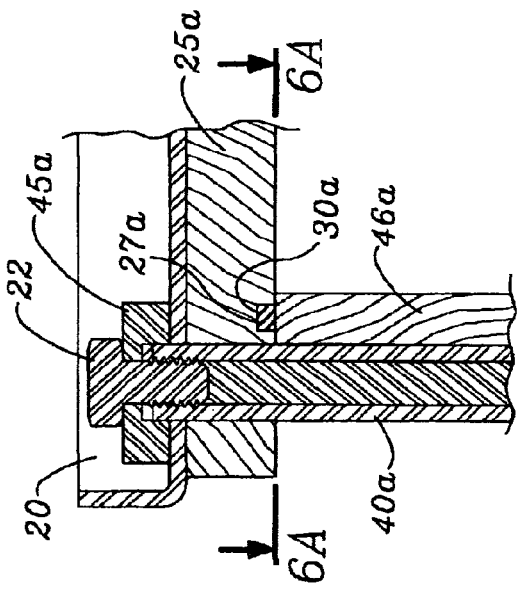
Figure 7A:
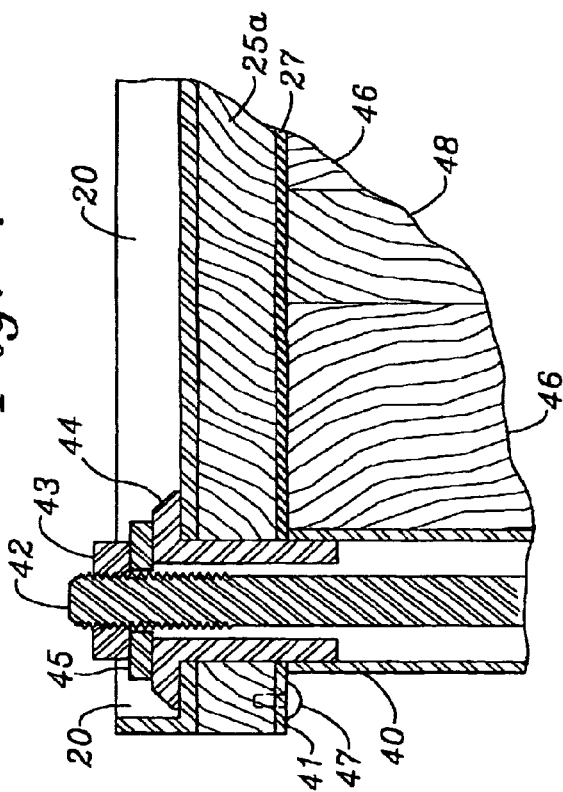
Figure 6:
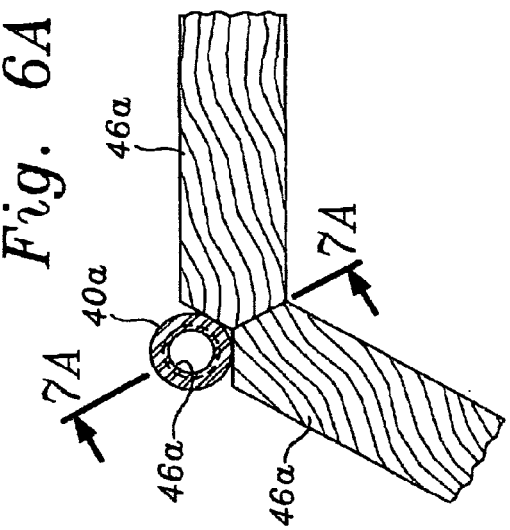
Figure 7:
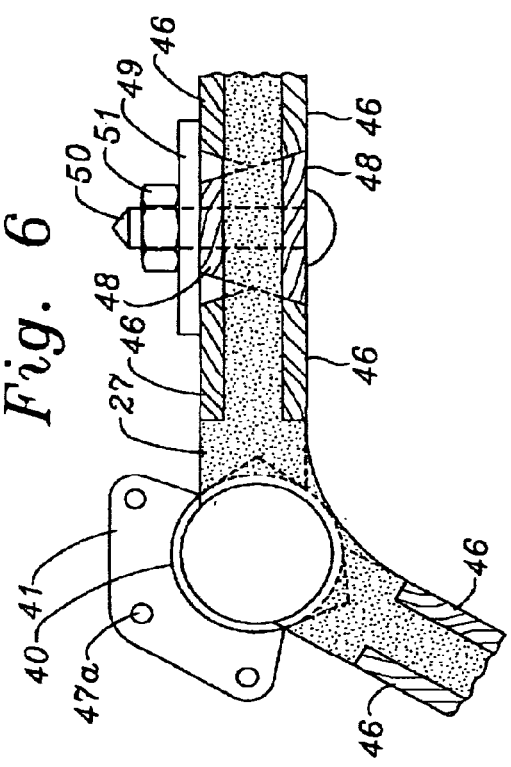
Figure 8:
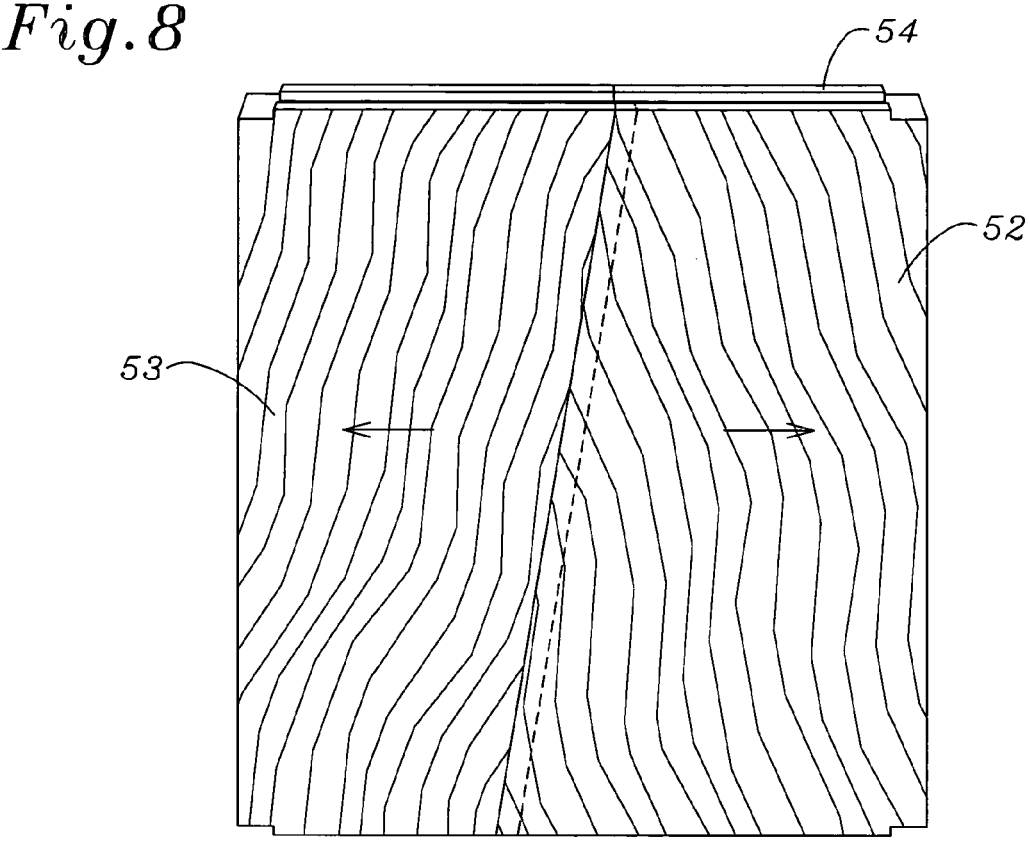
Figure 9:
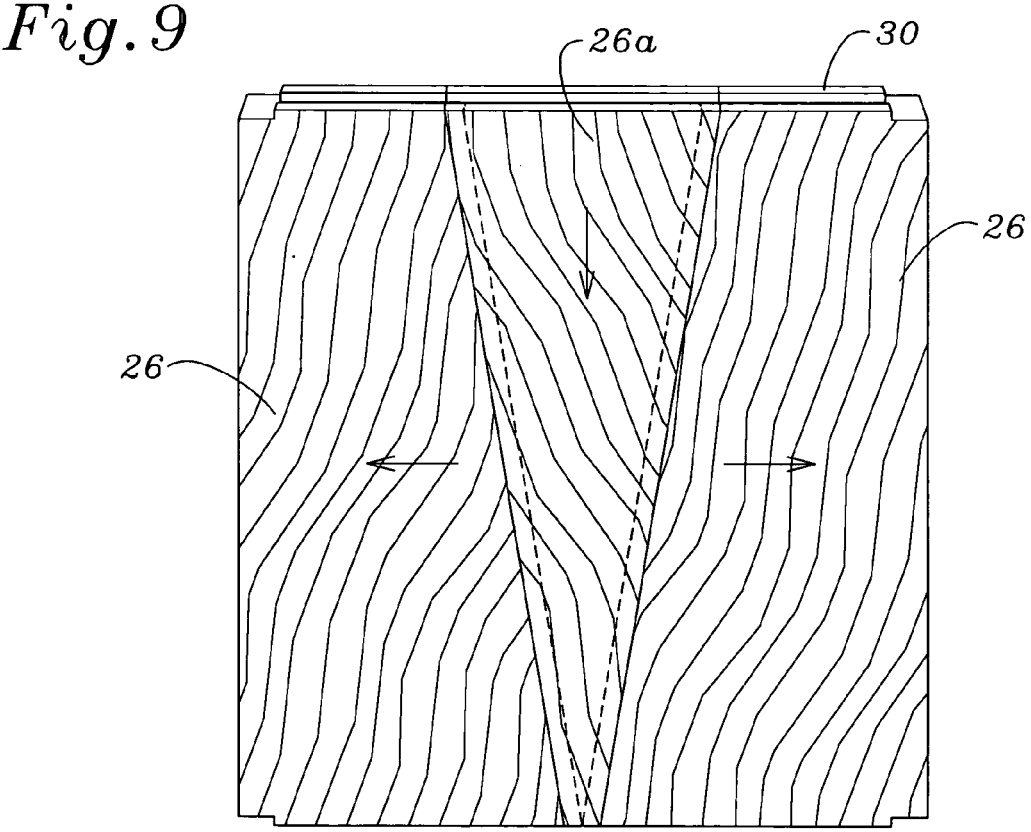
Figure 10:
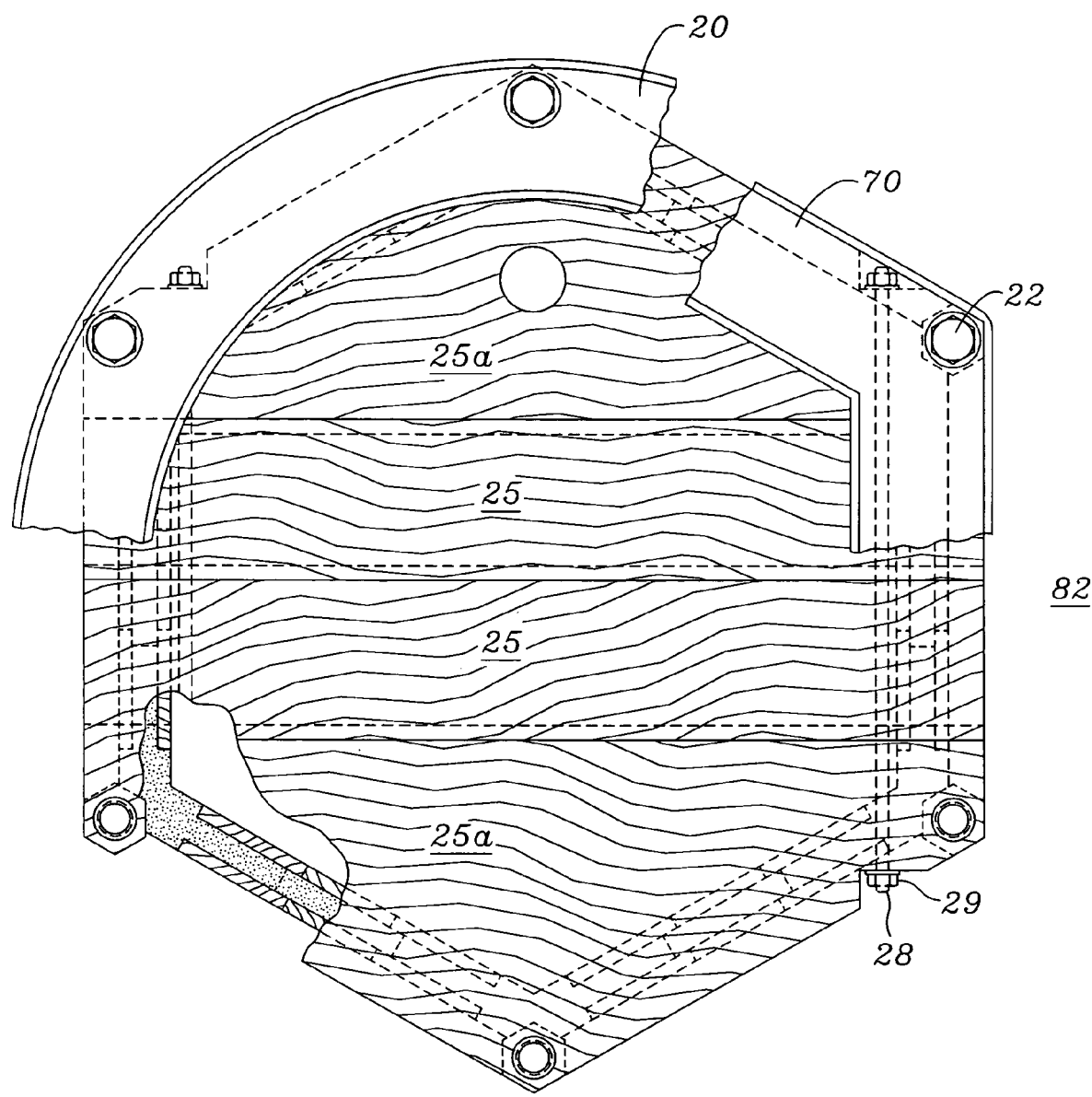
Figure 11:
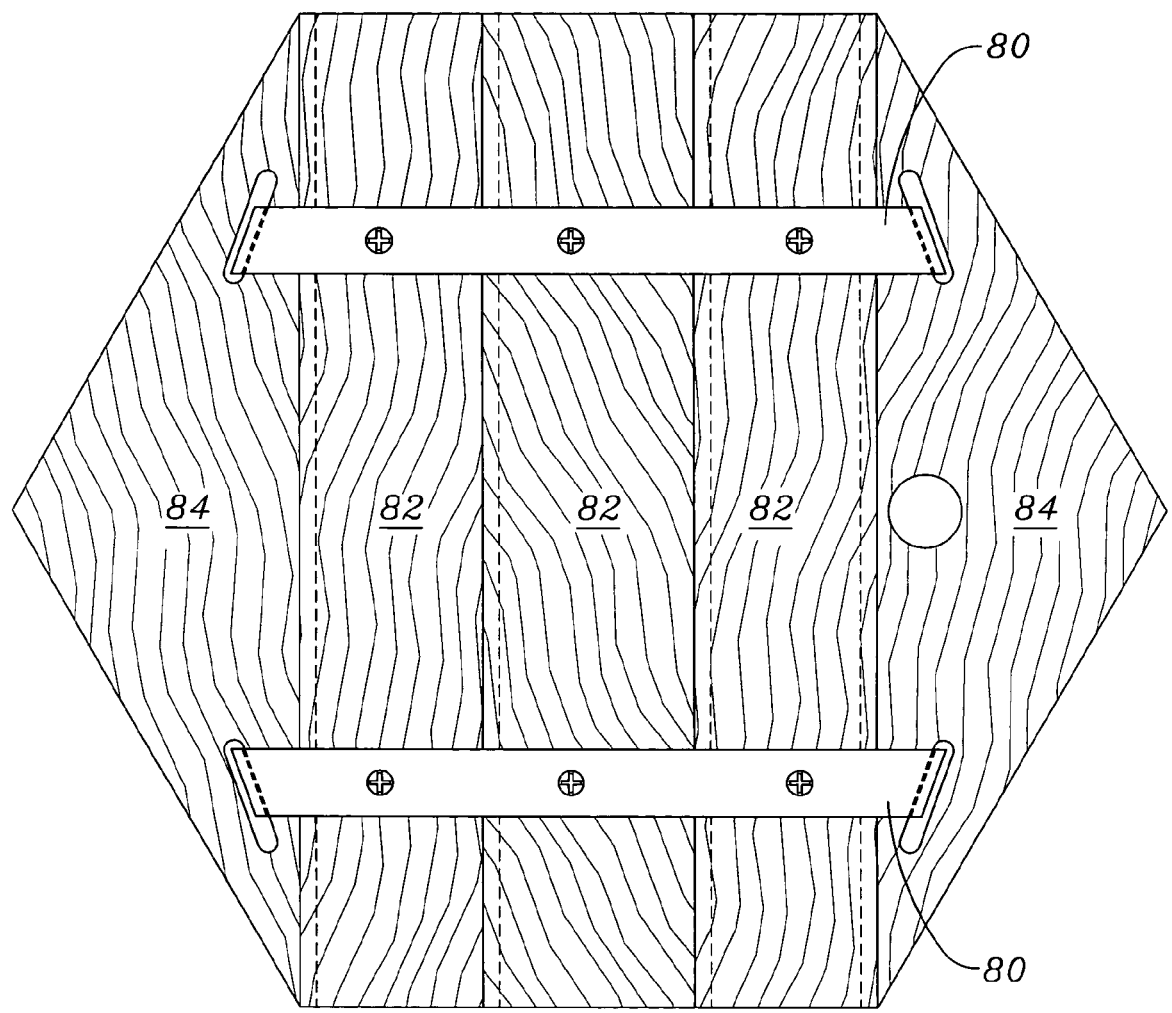
Figure 12:
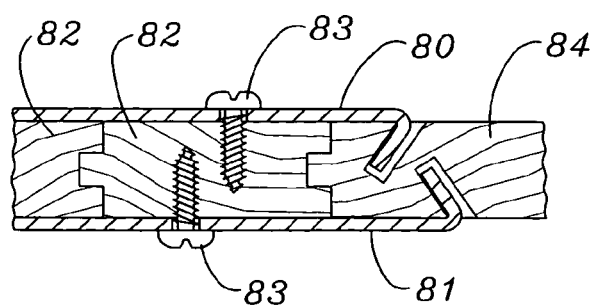

FIG. 6 partially illustrates another embodiment of the wine barrel of the invention with the wood end panel and the U-shaped ring removed for clarity;

FIG. 6A partially illustrates a variation of the embodiment of FIG. 6 using circular tubes as connecting rods;

FIG. 7 is a sectional view more completely illustrating the wine barrel embodiment of FIG. 6;

FIG. 7A is a sectional view more completely illustrating the variation of FIG. 6A;

FIG. 8 illustrates the method of achieving a liquid tight barrel with use of tapered wood side panels having tongue and groove joining means;

FIG. 9 illustrates, enlarged for clarity, the method of achieving a liquid tight barrel wherein the center wood piece is of a wedge shape having tongue and groove joining means;

FIG. 10 illustrates a circular upper and lower ring to facilitate barrel rolling and another configuration having straight-sided rings to correspond to the number of flat sides of the barrel;

FIG. 11 illustrates another method of attachment of adjacent wood panels by the use of wedge type metal plates; and FIG. 12 is a sectional view of part of FIG. 11 showing how the ends of the metal plates fit into the wood panel and how to achieve clamping force to provide for a liquid tight barrel.

DESCRIPTION

Referring to the drawings in general there is illustrated and disclosed a unique wine barrel that reduces costs associated with traditional wine barrels. The wine barrel illustrated and disclosed has a rigid reusable frame; such as of metal that encloses replaceable substantially planar wood panels. The panels can be removed from the frame, turned inside out, replaced and reused or new panels can be installed. Thus, for introduction of a caramel taste to the wine the wood panels can be burned in an oven with the degree of caramelization controlled by the temperature and time in the oven. Usual cooperage skill and time is eliminated, as assembly of the barrel is straightforward requiring only minimum tools and skills. As will be explained, when assembled the frame and not the wood panels support all the external and internal loads of the wine barrel. The frame provides sufficient stacking strength and the wine is exposed only to wooden surfaces. Referring initially to FIGS. 1-5 and 9, the rigid framed wine barrel having replaceable planar wooden panels embodying features of the invention will be described.

For convenience a listing of the reference numerals, in which like reference numerals refer to like elements in the several views, with a brief description of their function, is as follows:

| Reference numerals | |
|---|---|
| 10. | Barrel assembly |
| 20. | Channeled U-shaped upper and lower rings |
| 21. | Threaded connecting bars to connect upper and lower rings to form a rigid frame |
| 22. | Threaded tie-bolt (six shown) |
| 23. | Locating bushing (six shown) |
| 24. | Bunghole |
| 25. | Upper and lower rectangular wood panels (two shown) |
| 25a. | Upper and lower triangular wood panels (two per end) |
| 26. | Side wood panels (two shown) |
| 26a. | Tapered side panel to apply side pressure to adjacent side panels 26 |
| 27. | Upper and lower gasket |
| 28. | Tie rod (two per end) |
| 29. | Tie rod nut |
| 30. | Groove in each end of wood panels 26 and 26a |
| 31. | Holes drilled in wood panels 25a (three in each panel) |
| 32. | Holes drilled in upper and lower rings 20 (one for each tie bolt 22) |
| 40. | Connector tubes |
| 41. | Extension plate to facilitate frame rigidity when tube type connecting bars used |
| 42. | Threaded draw stud |
| 43. | Draw stud nut |
| 44. | Draw stud-locating bushing |
| 45. | Draw stud washer |
| 46. | Wood panel |
| 47. | Extension plate screw |
| 47a. | Holes for extension plate screw |
| 48. | Parallel-sided trapezoid cross sectional wedge (one per side) |
| 49. | Plate for wedge 48 |
| 50. | Wedge bolt for plate 49 |
| 51. | Wedge bolt nut |
| 52. | Tapered wood panel |
| 53. | Tapered wood panel |
| 70. | Straight sided ring configuration |
| 80. | Upper hooked joining plate |

-continued

Reference numerals

| | |
|---|---|
| 81. | Lower hooked joining plate |
| 82. | Alternate rectangular end wood panels |
| 83. | Screws for hooked joining plates |
| 84. | Alternate triangular end wood panels |

Figure 1:
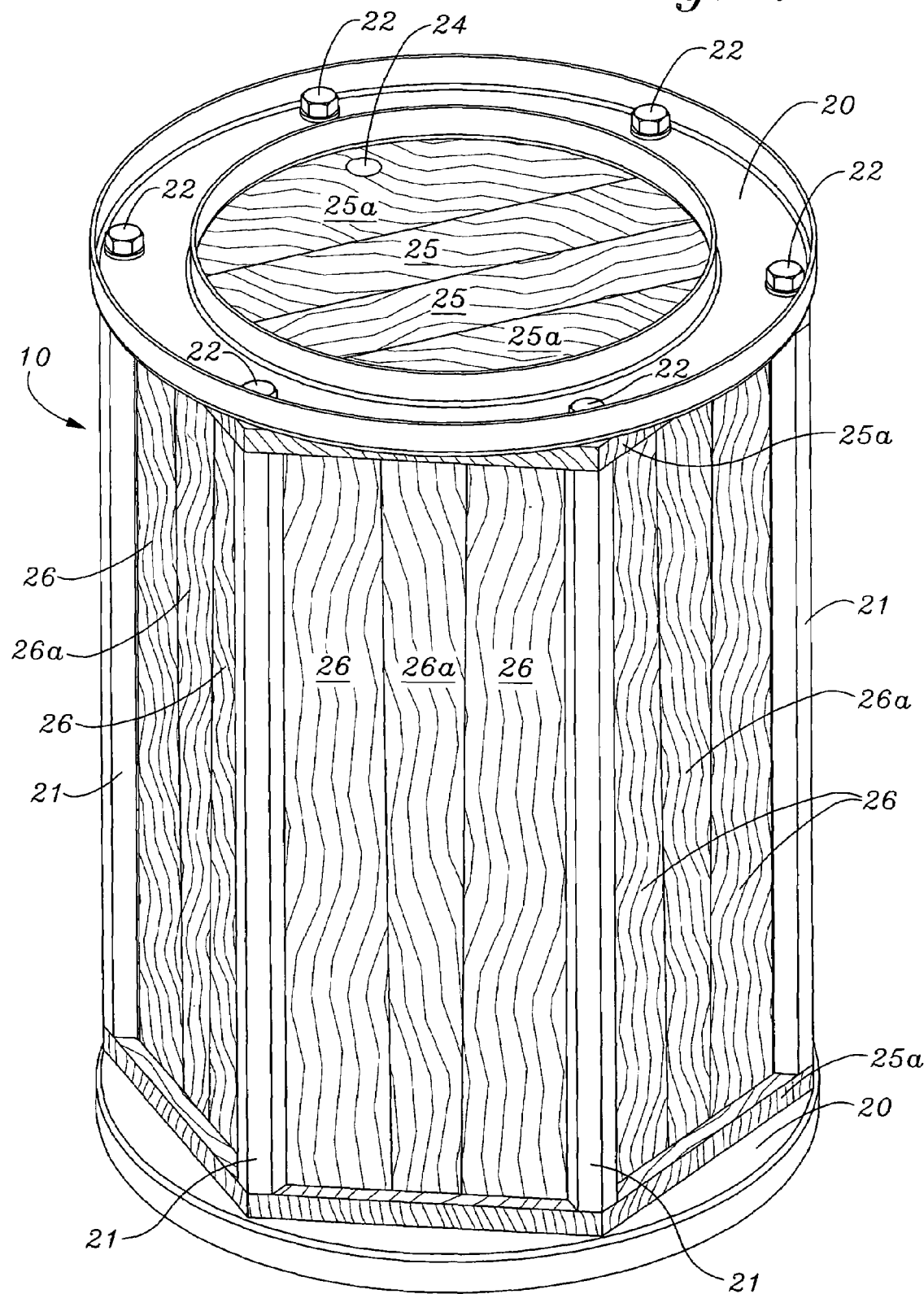
FIG. 1 is a perspective view of the assembled wine barrel of the invention.
Figure 2:
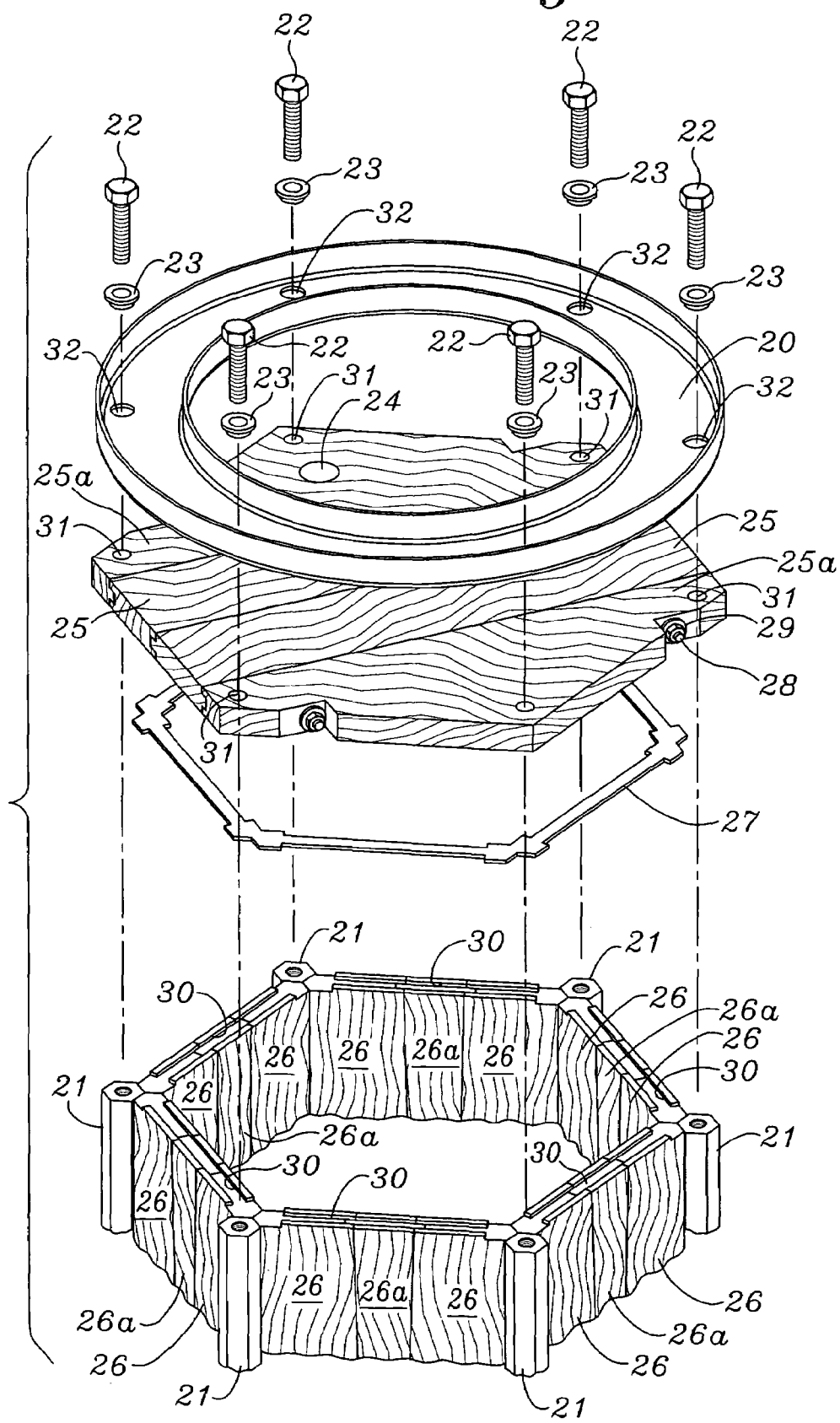
FIG. 2 is an exploded view of one end and part of the center section of the wine barrel of FIG. 1.

FIG. 1 is a perspective elevation view of the wine barrel, generally designated 10, in accordance with the invention, and FIG. 2 is an exploded view of the top end and a portion of the center section of the wine barrel 10 of FIG. 1. The corresponding lower portion, that is, the bottom end and the remainder of the center section is not shown since, except for the bunghole 24, the corresponding lower portion is identical such that it would appear as an inverted FIG. 2. Thus, as shown or indicated in FIGS. 1 and 2, both ends have identical upper and lower U-shaped cross sectional rings 20, wood end panels 25 and 25a, tie rods 28, tie rod nuts 29, and gaskets 27. Only the top end is shown with bunghole 24. Rings 20 are shown U-shaped since this configuration adds strength against buckling and/or twisting of the rings 20. Other configurations such as a thicker flat plate or an outer L-shaped configuration could be used.

Briefly, as better illustrated in FIGS. 1 and 2, the wine barrel 10 includes a rigid frame formed of circular upper and lower channeled U-shaped cross sectional rings 20, the rings 20 having holes 32 for receiving and locating threaded connecting bars 21 together with threaded tie-bolt 22 and associated locating bushing 23, thus the position and number of holes 32 will establish the number of barrel sides. Within this frame of connecting bars 21 and upper and lower rings 20 are upper and lower wood panels 25, 25a with holes 31 of identical numbers and locations as in the upper and lower rings 20, and wood side panels 26, 26a. As shown more clearly in FIG. 9 and explained below, wood panel 26a is wedge-shaped and panels 26 are configured to evenly and abuttingly accept panel 26a under pressure.

Connecting bars 21 are attached to U-shaped cross sectional rings 20 through holes 32 and end panels 25a through holes 31 corresponding in number and position with holes in said ring 20 by means of locating bushing 23 and tie-bolts 22.

Connecting bars 21 are shown in hexagonal configuration but may be of other suitable configuration. As will be further explained below, in assembly of the barrel 10, and after the upper and lower ends are assembled, side panel members 26 are placed in position against the connecting bars 21. The tapered wedge shaped panel 26a is then placed in position resting against the angled sides of the corresponding side panel 26. Then, with the aid of locating bushings 23 and threaded tie-bolts 22, the gaskets 27, wood panels 25, 25a and U-shaped cross sectional rings 20 are fitted to the connecting bars 21. Threaded tie-bolts 22 are then tightened to press the wood side panels 26a downward against adjacent side panels 26 and against the upper and lower wood panels 25, 25a thereby to provide a liquid tight barrel.

FIG. 3 is a partially cut away top view of one corner of the wine barrel of FIG. 1 illustrating fitting of the connection bars 21, the wood side panels 26, 26a, and the upper gasket 27 as it fits into the grooves 30 of wood panels 26, 26a. The U-shaped circular cross sectional ring 20 is also shown partially cut away.

FIG. 4 is a sectional view of the wine barrel 10 taken along lines 4-4 of FIG. 3. Taken through the center of the connecting bar 21, illustrated is the manner in which triangular wood panels 25a are mounted to wood panels 26, 26a by means of tie bolt 22 screwing into connecting bar 21 by way of locating bushing 23 and U-shaped ring 20. A portion of gasket 27 showing how it is compressed against wood panels 26, 26a is also shown.

FIG. 5 is an elevation sectional view of the wine barrel 10 taken along lines 5-5 of FIG. 3. Illustrated is the manner in which gasket 27 is trapped within the ends of the wood panels 26, 26a, and how the assembled wood panels 25, 25a overlay gasket 27 and cooperate with the "U" shaped cross sectional ring 20 to form a rigid strong frame assembly. The ends of the side panels 26, 26a have grooves 30 for trapping a portion of the gasket 27 therein, the depth of the grooves 30 determinative of the amount of pressure that can be applied to the gasket 27 during assembly of barrel 10. The depth of the groove 30 therefore controls the amount of reduction in thickness the gasket 27 will receive when upper and lower wood panels 25, 25a are pressed against the ends of the side panels 26, 26a. The combination of the pressure fit of panel 26a with panels 26, and of panels 25,25a with 26, 26a provides for a liquid tight barrel.

As explained above, in assembly of barrel 10 the two end plates are first assembled into a framework using connecting bars 21, after which side wood panel members 26, 26a are fitted within the resulting framework. The barrel 10 is then securely assembled by means of locating bushings 23 and associated nut 24.

In sequence, one end comprised of a ring 20, wood panel's 25, 25a, threaded tie bolts 28 and associated tie rod nuts 29, and gasket 27 is assembled. First, wood panels 25, 25a, which have been machined with tongue and groove ends, are joined after which they are secured by threaded tie rods 28 and associated tie rod nuts 29, tie rods 28 having been placed through previously drilled holes (not shown) in wood panels 25, 25a. The assembled end plate is then placed on an inverted U-shaped cross sectional ring 20 and locating bushings 23 are placed into the corresponding holes 31. The connecting bars 21 are next attached to the lower assembled wood panels 25, 25a and ring 20 using tie bolts 22 and locating bushings 23 with the bars 21 pointing upward.

The lower gasket 27 is then fitted atop the assembled wood panels 25, 25a within the connecting bars 21 land side panel members 26, 26a are placed in position above the lower gasket 27 and against the connecting bars 21. The tapered wedge-shaped panel 26a is placed in position between the angled sides of the two panels 26, the upper end of panel 26a being somewhat higher than the ends of panels 26 in the absence of downward pressure to panel 26a. The upper gasket 27 is placed over the side panels and into the grooves 30. The upper assembled wood panels 25, 25a and U-shaped cross sectional ring 20 are then positioned in place with the aid of locating bushings 23. Tie-bolts 22 are next engaged and evenly tightened until the wedge-shaped panel 26a is moved downward to press against the panels 26 to become level with panels 26. At this time the upper ends, side panels 26, 26a, and wood panels 25, 25a, cooperate to create a liquid tight barrel.

FIG. 6 illustrates another embodiment of the wine barrel 10 in accordance with the invention wherein a wooden wedge 48 having a trapezoid cross section is compressed between adjacent wood panels 46 and thus expands against panels 46 to create a liquid tight barrel. The wedge 48 is compressed between adjacent wood panels 46 with coaction by wedge plate 49, wedge bolt 50 and wedge nut 51, all of stainless steel. FIG. 6 further indicates the use of round stainless steel tubes 40 for connecting the top and bottom wooden panels 25, 25a and U-shaped cross sectional rings 20. This embodiment is further shown and described in FIG. 7. FIG. 6 also illustrates extension plate 41 used to augment rigidity of the barrel frame when tube connecting bars 40 are used. The wedge 48 and tube 40 embodiments are both illustrated in FIG. 6; however, they may be used in separately embodiments as may be desired. It is to be understood that although stainless steel is intended to be specified wherein wine may come in contact with other than wood, other suitable material that is non-reactive to wine may also be used.

FIGS. 6A and 7A illustrate a variation of the invention using circular tubes as connecting rods. FIG. 6A partially illustrates the variation of the embodiment of FIG. 6 using circular tubes 40a as connecting rods. FIG. 7A is a sectional taken through the center of circular tube 40a and of side wood panels 46a of FIG. 6A, and more completely illustrates the variation. In this variation round tubes 40a are used as connecting rods and frame 10 is constructed without the use of locating bushings 23. Connecting rods 40a extend through the top and bottom wooden plates 25, 25a and of u-shaped rings 20. This extension of connecting tubes 40a into u-shaped rings 20 insures proper placement of the tubes 40a and by tightening of threaded tie-bolts 22 the rings 20 are clamped against upper and lower wood panels 25, 25a, wood panels 25, 25a in turn clamping against side wood panels 26, 26a to compress gasket 27a within the groove 30a thereby forming a liquid tight wine barrel. In this case the grooves in side panels 26, 26a can be eliminated since as shown in FIG. 7A gasket 27a can be captured and compressed into groove 30a in upper and lower wood panels 25, 25a. In assembly, using washers 45a tie-bolts 22 are engaged with connector tubes 40a and assembled essentially as were connecting rods 21 as previously described.

FIG. 7 is a sectional view taken through the center of the tube 40 and of side wood panels 46 of the embodiment of FIG. 6. Shown is tube 40, extension plate 41, threaded draw stud 42, draw stud nut 43, draw stud locating bushing 44, and draw stud washer 45. In assembly, each tube 40 has a draw stud 42 inside and is assembled essentially as were connecting bars 21 as previously described. Draw stud locating bushings 44 are inserted through the U-shaped cross sectional ring 20 and wood panels 25a, and into tubes 40 after which the frame is tightened using draw stud washer 45 and draw stud nut 43. Extension plate 41 is affixed to the underside of wood panel 25a by fitting extension plate screws 47 through extension plate holes 47a.

FIG. 8 illustrates an alternate method of achieving a liquid tight barrel with use of tapered wood panels 52 and 53 that have tongue and groove joining means. When the rigid frame is tightened these panels exert side pressure as indicated against the connecting means of the frame thereby achieving a liquid tight barrel.

FIG. 9 illustrates more clearly the method of achieving a liquid tight barrel wherein the center wood piece 26a has a wedge shape as previously discussed. When the frame is tightened wood piece 26a is pressed downward and exerts side pressure against adjacent panels 26 as indicated; these panels tapered to accept wedge shaped wood piece 26a.

FIG. 10 illustrates alternate configurations for the upper and lower barrel rings. The circular configuration 20 facilitates rolling of the barrel during transportation. The straight-sided configuration 70 has sides corresponding in number to the number of flat sides selected for the barrel. Six sides are shown in the figure.

FIG. 11 is a top view of another method of end plate assembly using stainless steel joining plates 80 to hold the wood pieces 82, 84 together. Similar lower stainless steel metal plates 81 are attached underneath the panels 82, 84 as shown in FIG. 12.

FIG. 12 is a sectional view of the assembly method of FIG. 11 illustrating the hooked configuration of the upper and lower stainless steel metal plates 80, 81, and how tongue and groove panels 82, 84 can be used to assemble an end plate.

In accordance with the above, there has been shown and described an improved wine barrel assembly having a re-useable rigid frame consisting of upper and lower U-shaped cross sectional rings with locating holes and a plurality of connecting members fitting into the locating holes, and within this frame replaceable end and side wooden panel components therein, thereby to create a new and unique barrel wherein after use only the end and side panels have to be reversed or replaced. While the invention has been described in connection with embodiments thereof, it is obvious that various modifications and changes can be made within the spirit and scope of the invention.

What is claimed is:

1. A wine barrel comprising:
a rigid external frame having upper and lower substantially identical rigid ring ends and a plurality of substantially straight and rigid longitudinal connecting means wherein said upper and lower ring ends have a plurality of holes to receive said connecting means to create a rigid cage-like frame, the position and number of said holes and the number of said connecting means predetermined to establish the number of barrel sides;
a plurality of wooden side panels fitted inwardly of said longitudinal connecting means in an abutting manner against said connecting means and against each other to form a multisided cylinder like structure wherein the ends of said cylinder like structure are exposed, and:
a plurality of wooden end panels butted against said exposed ends of said cylinder like structure thereby providing a substantially leak-proof barrel.

2. The wine barrel of claim 1 wherein said wooden end panels have a plurality of holes corresponding in position and number with said plurality of holes in said upper and lower rigid ring ends.

3. The wine barrel of claim 1 wherein said wooden side panels press against each other and against said connecting means resulting in outward pressure against said connecting means thereby to provide a leak proof circumferential portion of said barrel.

4. The wine barrel of claim 1 wherein said connecting means are positioned in said holes of said rigid ring ends to withstand said outward pressure.

5. The wine barrel of claim 1 wherein said side panels are generally planar and replaceable and are reversible to present the unused side to the interior of said barrel.

6. The wine barrel of claim 1 wherein said rigid ring ends are generally circular rings and said frame is reusable for replacement of said side panels and said end panels.

7. The wine barrel of claim 6 wherein said rigid ring ends have a multisided configuration.

8. The wine barrel of claim 3 wherein said side panels are complementary and at least one of said side panels is wedge shaped effecting side pressure to an adjacent panel having an angular side during assembly.

9. The wine barrel of claim 1 wherein said connecting means are straight members with configuration taken from the group including multisided and circular.

10. A wine barrel comprising:
a plurality of longitudinal connecting members;

a pair of substantially identical generally circular rigid ring ends having holes for receiving and locating said plurality of longitudinal connecting members connected to form a rigid external frame;

wooden end panels having holes corresponding in position and number with said plurality of holes in said upper and lower rigid ring ends;

wooden side panels fitted inwardly of said connecting members in an abutting manner against said connecting means and against each other to form a multisided cylinder like structure;

said connecting members including means for interchangeably capturing and securing said wooden side panels; and wherein during assembly said wooden end panels are positioned between said circular end rings and ends of said wooden side panels whereby in conjunction with said connecting members pressure is applied to the said ends of said wooden side panels to create a liquid tight barrel.

11. The wine barrel of claim 10 wherein said wooden side panels are complementary and at least one component of said wooden side panels is wedge shaped providing side pressure to an adjacent wooden component side panel having an angular side to effect a liquid tight barrel.

12. The wine barrel of claim 10 wherein said wooden side panels and said wooden end panels are replaceable including reversible replacement to present the unused side to the interior of said barrel.

13. The wine barrel of claim 10 including gasket means interposed between said wooden end panels and said wooden side panels.

14. The wine barrel of claim 13 further including hardware means for assembling said frame, said wooden end panels, said gasket, and said wooden side panels to form a substantially liquid tight barrel and wherein said connecting means are straight rigid members.

15. The wine barrel of claim 10 wherein the configuration of said connecting means is taken from the group including multisided and circular.

* * * * *